US008533319B2

(12) United States Patent
Draugelis (10) Patent No.: US 8,533,319 B2
(45) Date of Patent: Sep. 10, 2013

(54) METHODS AND SYSTEMS FOR PRIORITIZING NETWORK ASSETS (75) Inventor: Michael Draugelis, Denver, CO (US)

(73) Assignee: Lockheed Martin Corporation, Bethesda, MD (US)

(*) Notice: Subject to any disclaimer, the term of this patent is extended or adjusted under 35 U.S.C. 154(b) by 373 days.

(21) Appl. No.: 12/792,289

(22) Filed: Jun. 2, 2010

(65) Prior Publication Data

US 2011/0302291 A1 Dec. 8, 2011

(51) Int. Cl.
G06F 15/173 (2006.01)
G06F 11/00 (2006.01)
G06F 12/14 (2006.01)
G06F 12/16 (2006.01)
G08B 23/00 (2006.01)

(52) U.S. Cl.
USPC ............................................. 709/224; 726/25

(58) Field of Classification Search
USPC ............................................. 709/224; 726/25
See application file for complete search history.

(56) References Cited

U.S. PATENT DOCUMENTS

| 6,678,245 | B1 | 1/2004 | Cooper et al. |
| 7,281,005 | B2* | 10/2007 | Canright et al. ............ 1/1 |
| 7,299,213 | B2 | 11/2007 | Cristianini |
| 7,322,044 | B2 | 1/2008 | Hrastar |
| 7,346,621 | B2* | 3/2008 | Zhang et al. ............ 707/802 |
| 7,409,716 | B2 | 8/2008 | Barnett et al. |
| 7,463,590 | B2 | 12/2008 | Mualem et al. |
| 7,493,320 | B2* | 2/2009 | Canright et al. ............ 1/1 |
| 7,543,055 | B2 | 6/2009 | Kohn |
| 7,577,650 | B2* | 8/2009 | Wen et al. ............ 1/1 |
| 7,594,009 | B2 | 9/2009 | Triulzi et al. |
| 7,594,270 | B2 | 9/2009 | Church et al. |
| 7,698,738 | B2 | 4/2010 | McCallam et al. |
| 8,019,763 | B2* | 9/2011 | Wang et al. ............ 707/738 |
| 2005/0086260 | A1* | 4/2005 | Canright et al. ............ 707/104.1 |
| 2005/0256832 | A1* | 11/2005 | Zhang et al. ............ 707/1 |
| 2006/0031938 | A1 | 2/2006 | Choi |
| 2006/0040711 | A1 | 2/2006 | Whistler |
| 2006/0212932 | A1 | 9/2006 | Patrick et al. |
| 2007/0198504 | A1* | 8/2007 | Feng et al. ............ 707/5 |
| 2007/0203940 | A1* | 8/2007 | Wang et al. ............ 707/103 R |
| 2007/0230908 | A1* | 10/2007 | Kitajima ............ 386/95 |

(Continued)

OTHER PUBLICATIONS

Kyrre Begnum et al: "Principle Components and Importance Ranking of Distributed Anomalies", Machine Learning, Kluwer Academic Publishers—Plenum Publishers, NE, vol. 58, No. 2-3, Feb. 1, 2005, pp. 217-230, XP019213445-,ISSN: 1573-0565, DOI: DOI:10.1007/ S10994-005-5827-4, chapters 2, 3, 5 and 6 equations 1 and 14.*

(Continued)

Primary Examiner — Thuong (Tina) Nguyen
Assistant Examiner — Tariq Najee-Ullah
(74) Attorney, Agent, or Firm — Oblon, Spivak, McClelland, Maier & Neustadt, L.L.P.

(57) ABSTRACT

Methods and systems for restoring networks to normal behavior are disclosed. For example, in various embodiments an apparatus for addressing device abnormalities in a network may include node monitoring circuitry configured to monitor device abnormalities in the network, and ranking circuitry that may receive information from the node monitoring device and, upon receiving information from the monitoring circuitry that multiple devices in the network are compromised, may provide ranking information as to which of the multiple compromised devices in the network is to be attended to first.

20 Claims, 3 Drawing Sheets

(56) References Cited

U.S. PATENT DOCUMENTS

| | | | |
|---|---|---|---|
| 2008/0010225 | A1 | 1/2008 | Gonsalves et al. |
| 2008/0016569 | A1 | 1/2008 | Hammer et al. |
| 2008/0229415 | A1 | 9/2008 | Kapoor et al. |
| 2009/0259646 | A1* | 10/2009 | Fujita et al. .................. 707/5 |
| 2009/0271504 | A1 | 10/2009 | Ginter et al. |
| 2009/0300730 | A1 | 12/2009 | Chaudhry et al. |
| 2010/0023598 | A9 | 1/2010 | Ginter et al. |
| 2010/0043074 | A1 | 2/2010 | Scates |
| 2010/0071054 | A1 | 3/2010 | Hart |
| 2010/0083380 | A1 | 4/2010 | Harris et al. |
| 2010/0205584 | A1* | 8/2010 | Jaeger et al. ................ 717/133 |

OTHER PUBLICATIONS

Reginald E Sawilla et al: "Identifying Critical Attack Assets in Dependency Attack Graphs", Oct. 6, 2008, Computer Security—Esorics 2008; [Lecture Notes in Computer Science], Springer Berlin Heidelberg, Berlin, Heidelberg, pp. 18-34, XP019108145, ISBN: 978-3-540-88312-8.*

Kleinberg J M: "Authoritative sources in a hyperlinked environment", Journal of the Association for Computing Machinery, ACM, New York; NY, US, vol. 46, No. 5, Sep. 1, 1999, pp. 604-632, XP002226183, ISSN: 0004-5411, DOI: DO1:10.1145/324133. 324140 chapters 3 and 5.1.1.*

Kyree Begnum, et al., "Principle Components and Importance Ranking of Distributed Anomalies", 2005, pp. 217-230, vol. 58, No. 2-3, Machine Learning, Kluer Academic Publishers—Plenum Publishers, The Netherlands.

Reginald E. Sawilla et al., "Identifying Critical Attack Assets in Dependency Attack Graphs", Computer Security—Esorics, 2008, pp. 18-34, Springer Berlin Heidelberg.

Kleinberg J.M., "Authoritative Sources in a Hyperlinked Environment", Journal of the Association for ComputingMachinery, Sep. 1, 1999, pp. 604-632, vol. 46, No. 5, New York, NY, US.

Shaonan Wang, et al., "RiskRank: Security Risk Ranking for IP Flow Records", Oct. 25, 2010, pp. 56-63, Network and Service Management (CNSM), 2010 International Confeence on, IEEE, Piscataway, NJ, USA.

May 26, 2011 PCT International Search Report issued in PCT/US2011/027646.

May 26, 2011 PCT Written Opinion issued in PCT/US2011/027646.

Cisco Data Sheet, "Cisco Security Monitoring, Analysis, and Response System 4.3.1/5.3.1," Dec. 2007, pp. 1-10.

Ironport DDG Release, Ironport S-Series Feature, "Overview—Web Security Monitor," Feb. 2007, pp. 1-6.

Dec. 4, 2012 International Preliminary Report on Patentability issued in PCT/US2011/027646.

European Office Action issued Jan. 18, 2013, in Patent Application No. 11709562.0.

* cited by examiner

METHODS AND SYSTEMS FOR PRIORITIZING NETWORK ASSETS

BACKGROUND

Networks, such as the Internet, various private networks serving individual businesses, and collections of servers and switches acting as backbones to various communications systems, are ubiquitous around the world. Unfortunately, these networks are prone to device failures and attacks by outside devices. By way of example, a particular server connected to the Internet may fail or may be "hijacked" to cause denial of service (DoS) attacks on other servers. When a failure or attack occurs upon any single device in a network, the standard operating procedure may be to replace or reset such device. However, when multiple devices in a given network are compromised, it may be necessary to address each compromised device one at a time noting that the sequence of fixes may need to be prioritized. Unfortunately, such prioritization of network fixes may become unwieldy when addressing large networks. Accordingly, new technology addressing network failures may be desirable.

SUMMARY

Various aspects and embodiments of the invention are described in further detail below.

In an embodiment, an apparatus for addressing device abnormalities in a network can include monitoring circuitry configured to monitor device abnormalities in the network, and ranking circuitry that receives information from the monitoring circuitry and, upon receiving information from the monitoring circuitry that multiple devices in the network are compromised, can provide ranking information as to which of the multiple compromised devices in the network is to be attended to first.

In another embodiment, a method for addressing device abnormalities in a network can include monitoring device abnormalities in the network to produce monitoring information, and when the monitoring information indicates that that multiple devices in the network are compromised, providing ranking information as to which of the multiple compromised devices in the network is to be attended to first.

In yet another embodiment, an apparatus for addressing device abnormalities in a network may include a monitoring means for monitoring device abnormalities in the network, and a ranking means for receiving information from the monitoring means and, upon receiving information from the monitoring means that multiple devices in the network are compromised, may provide ranking information as to which of the multiple compromised devices in the network may be attended to first. The ranking means may be configured to provide ranking information using a hub-ranking set containing hub scores representing relative values of connections between devices in the network, and an authority-ranking set containing authority scores representing relative values of individual devices in the network. Both the hub-ranking set and the authority-ranking set may be derived using a weighted Hyperlink Induced Topic Search (HITS) algorithm. The ranking means may also be configured to produce ranking information based upon at least one of information relating to a type of failure of at least one compromised device in the network and a type of attack upon at least one compromised device in the network.

BRIEF DESCRIPTION OF THE DRAWINGS

The features and nature of the present disclosure will become more apparent from the detailed description set forth below when taken in conjunction with the accompanying drawings in which reference characters identify corresponding items.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
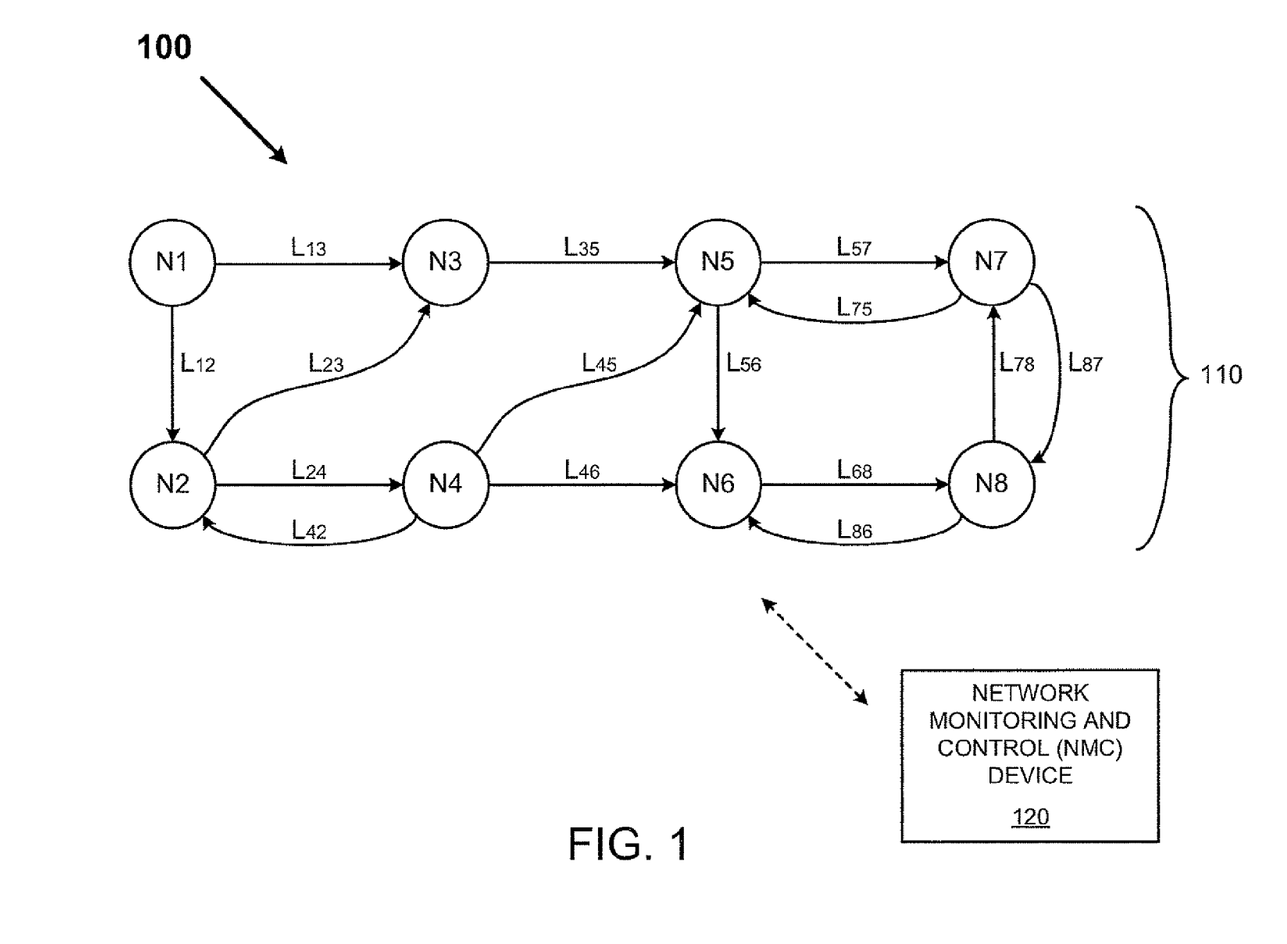
FIG. 1 depicts an exemplary communication system.

FIG. 1 depicts an exemplary networked communication system 100 capable of being orderly restored to normal operation after the occurrence of multiple abnormalities affecting multiple devices. For the purpose of this disclosure, it is to be appreciated that the term "abnormality" and its derivatives may be construed broadly to encompass any number of issues known to affect the performance of a networked communication system as is known to those skilled in the arts. For example, the term "abnormality" may be used to describe a hardware failure of a device, such as a server or firewall, that requires replacement of such a device, or a software/firmware failure of a device that may require some form of device reset. Note, however, that the term "abnormality" may also include some form of influence external to a device that affects performance, such as a Denial of Service (DoS) attack, or an indication that a device is infected with a computer virus that may possibly spread to other devices.

Returning to FIG. 1, the exemplary networked communication system 100 includes a network 110 of eight devices/nodes N1-N8 interconnected in various fashions using various links $L_{NM}$, and a network monitoring and control (NMC) device 120.

In an initial operation, the NMC device 100 may create ranking information for the network 110 describing the priority of which of any of multiple abnormal/compromised devices/nodes N1-N8 may be addressed first based upon the "normal" operation of the network, i.e., when the network 110 is not somehow impaired by device failures, device hijackings, computer virus problems, DoS attacks, and so on. In the exemplary embodiment of this disclosure, such priority information may be determined by first deriving both objective and subjective information about the network 110.

The objective information may include basic information about the network, such as the existence of each device/node N1-N8 as well as information describing which devices/nodes N1-N8 communicate with other devices/nodes N1-N8, what type of information is transmitted between devices/nodes N1-N8 and how much of each type of information is transmitted. For example, the NMC device 120 may need to determine the existence of nodes N1 and N2, as well as acquire information relating to the nature of each link $L_{NM}$, e.g., link $L_{13}$ allows device/node N1 to send information to device/node N3 while links $L_{24}$ and $L_{42}$ allow for bi-directional communication between devices/nodes N2 and N4. By way of further example, the NMC device 120 may also need to determine, through direct observation or via some other means, that device/node N1 provides three different sorts of information to device/node N3 including security camera data of 50 Mbytes/hour, fire alarm information data of 2 Mbytes/hour, and corporate email that varies from 0 Mbytes/hour to 10 Mbytes/hour.

Next, the NMC 120 may receive human-subjective information whereby a user can input some form of valuation of various assets and/or the mission of each data type. For instance, using the example above a user may assign high priority/value to fire alarm data, lower priority to security camera information and a much lower priority to corporate email. The user might also/alternatively assign higher priority to servers supporting security and safety roles than servers supporting only email.

Once the NMC device 120 has received the various objective and subjective information, the NMC device 120 may determine and store authority and hub ranking information that ranks the various nodes/devices N1-N8 (referred hereafter as "hub" and "authority" scores), Once the hub and authority scores have been determined, upon an occurrence where two or more abnormalities occur in the network 110, the NMC device 120 may provide information—either to human operators or to automated equipment—as to which problem should be attended to first. For example, upon an instance where a server collecting security information has failed, and another server supporting a company's website has been hijacked and is causing DoS attacks on servers supporting email and website advertising, the NMC device 120 may issue information to human operators directing such operators to address the server collecting security information first. Alternatively, the NMC device 120 may issue commands to automated equipment causing the failed server to be replaced with a "hot spare", before issuing other commands to the hijacked server to reset itself, cease issuing any output packets and/or purge illicit software, if possible.

Figure 2:
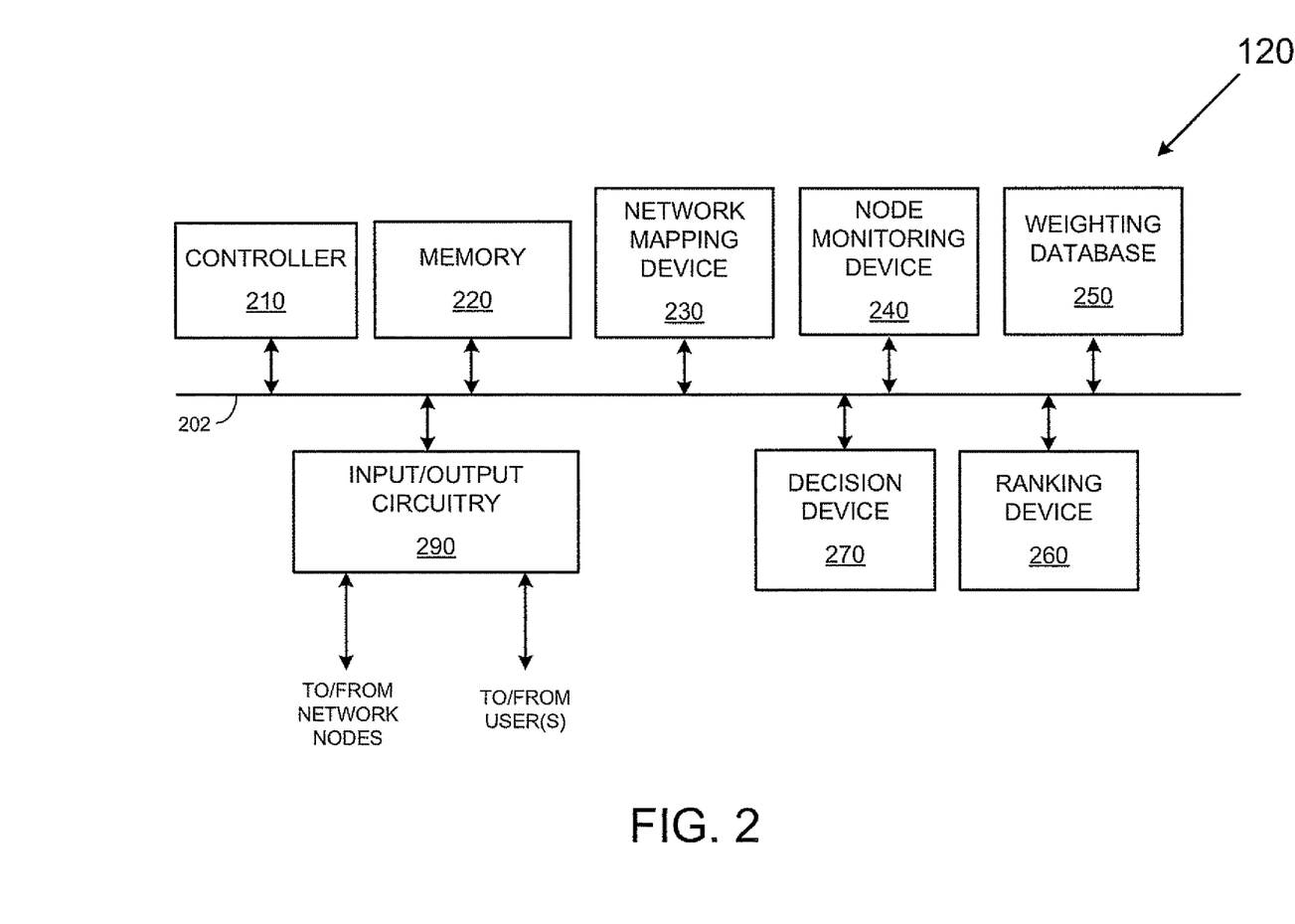
FIG. 2 depicts details of the exemplary network monitoring and control device of FIG. 1.

FIG. 2 depicts details of the exemplary NMC device 120 of FIG. 1. As shown in FIG. 2, the exemplary NMC device 120 includes a controller 210, a memory 220, a network mapping device 230, a node monitoring device 240, a weighting database 250, a ranking device 260, a decision device 270 and input/output circuitry 290. The above components 210-290 are coupled together by control/data bus 202.

Although the exemplary NMC device 120 of FIG. 2 uses a bussed architecture to depict separate electronic devices coupled together with a common bus, it should be appreciated that any other architecture may be used as is well known to those of ordinary skill in the art. For example, in various embodiments, the various components 210-290 can take the form of separate electronic components coupled together via a series of separate busses. Still further, in other embodiments, one or more of the various components 210-290 can take form of separate servers coupled together via one or more networks.

It also should be appreciated that some or all of the above-listed components can take the form of software/firmware routines residing in memory 220 and be capable of being executed by the controller 210, or even software/firmware routines residing in separate memories in separate servers/computers being executed by different controllers.

In operation and under control of the controller 210, the network mapping device 230 may receive objective information from a number of external sources via the input/output circuitry 290, such as human operators and network sniffer applications. As discussed above, such objective information may include data relating to the existence and type of each device/node in a network as well as to the connectivity between various devices/nodes. Thereafter, the network mapping device 230 may create a matrix representation of the network at issue. For example, using the network 110 depicted in FIG. 1, the network mapping device 230 may create an 8×8 adjacency matrix A populated with 1s and 0s representing the presence or absence of links $L_{NM}$. For instance, entry $a_{12}$ of matrix A representing link $L_{12}$ may be given a "1" value while entry $a_{21}$ of matrix A may be given a "0" value, and so on. As adjacency matrices are well known to those skilled in the art of website searching, no further information regarding adjacency matrices will be provided in this disclosure.

Next, the node monitoring device 240 may similarly receive network information relating to other objective information, such as the various types of data used in the network and amounts or such data transmitted from device to device—assumedly during normal operation of the network—and provide such information to the weighting database 250. Thereafter, the weighting database 250 may receive subjective information from a user or other human operator relating to the importance assigned to various devices and types of data based upon their respective missions and possibly other criteria.

Once the weighting database 250 has received the objective and subjective information, the weighting database 250 may create an importance/weighting vector, $W_{node}$ and an importance/weighting vector $W_{edge}$, which respectively represent the collective importance assigned to each node and "edge" of the network—an "edge" being the sum of all outgoing links of a particular node. In various embodiments, such vectors $W_{node}$ and $W_{edge}$ may be derived by some statistical, regressive and/or parametric formula combining objective and subjective information. However, the particular means of deriving vectors $W_{node}$ and $W_{edge}$ may change from embodiment to embodiments as may be recognized by those skilled in the art.

Next, the ranking device 260 may use the adjacency matrix A and the importance vectors $W_{node}$ and $W_{edge}$ may to create authority and hub scores representing relative values of individual devices in the network. As hub and authority rankings are also well known to those skilled in the art of website searching, no further descriptive information will be provided in this disclosure.

In the exemplary embodiment of FIG. 2, the ranking device 260 may use what is known in the art of website searching as the Hyperlink Induced Topic Search (HITS) algorithm to derive the hub-ranking set/vector and authority-ranking set/vector. While the basic HITS algorithm is well known in the context of search engines, its application to network restoration and repair is previously unknown. In the present embodiment, the HITS algorithm is modified using the weighting vectors discussed above to create a weighted HITS algorithm as shown in EQ. (1) below:

$$A(N_j) = \sum_{N_i \in I_j} \frac{A(N_i)}{|I_i|} \times W_{node(i)} \times W_{edge(ij)} \qquad \text{EQ. (1)}$$

where $N_j$ and $N_i$ represent nodes in a network, $A(N_j)$ and $A(N_i)$ represent the respective authority rank for nodes $N_j$ and $N_i$, $I_j$ represents a set of inlinks for node $N_i$, $|I_i|$ represents the order or size of set $I_i$, $W_{node(i)}$ is an importance/weighting vector for node $N_1$, and $W_{edge(ij)}$ is an importance/weighting vector for the connectivity between nodes $N_i$ and $N_j$. Note that the authority rank of node $N_j$ is a summation of the fraction of authority ranks of its in-links. Also note that $W_{node(i)}$ and $W_{edge(ij)}$ account for mission relevance and network configuration.

From EQ. (1), a hub-rank $H(N_j)$ for each device/node in a network may be derived using EQ. (2) below:

$$H(N_j) = \sum_{N_j \in O_j} \frac{A(N_i)}{|I_i|} \qquad \text{EQ. (2)}$$

where represents a set of all nodes to which node $N_j$ that links.

Using EQ. (2), the ranking device 260 may create a set, i.e., a 1×P vecotor/matrix, of hub scores representing relative values of connections between devices in the network Next, the ranking device 260 may create a set, i.e., a 1×P set/vector/matrix, of authority-ranking matrix containing scores representing relative values of the P individual devices in a network. To do so, the same set of operations and equations used to create a hub matrix may be used with the exception that the adjacency matrix A may be substituted with its transpose $A^T$.

In conceptual terms, it should be appreciated that an authority score can describe which devices in a network are important while a hub score can describe which devices send data to important devices, i.e., it may represent the importance of connections between devices. Accordingly, it should be appreciated that the type of abnormality affecting a network may determine whether a hub score should be used to address multiple failures in a network, an authority score should be used, or some combination of the two scores should be used. Consider, for example, Table 1 below, which contains exemplary hub scores and authority scores for the network 110 of FIG. 1.

TABLE 1

| NODE | HUB SCORES | AUTHORITY SCORES |
|---|---|---|
| N1 | 0.0325 | 0.0188 |
| N2 | 0.0522 | 0.0572 |
| N3 | 0.0720 | 0.0267 |
| N4 | 0.1011 | 0.0673 |
| N5 | 0.1813 | 0.1285 |
| N6 | 0.2398 | 0.1866 |
| N7 | 0.1697 | 0.2057 |
| N8 | 0.1520 | 0.3093 |

Using the values of Table 1, the ranking device 260 may provide sub-sets of such information to a user via the input/output circuitry 290, or alternatively provide the data to the decision device 270 so as to allow some of automated network restoration whereby the decision device 270 may use the appropriate the hub and authority scores to address the order of restoration.

Now consider a scenario where the node monitoring device 240 determines through direct or indirect observation that nodes N6 and node N7 are simultaneously compromised by hardware failures due to a power surge. In such a case, it may be more appropriate to use authority scores, rather than hub scores, to determine which node to address first. Accordingly, in this scenario it may be more appropriate to address node N7 first as the authority score for node N7 is greater than the hub score for node N6.

Now alternatively consider the scenario where the node monitoring device 240 determines that nodes N6 and node N7 are simultaneously compromised by both being infected by a computer virus causing nodes N6 and N7 to be DoS threats to other nodes. Unlike the previous example, in this case it may be more appropriate to use hub scores, rather than authority scores, to determine which node to address first. Thus, in this scenario it may be more appropriate to address node N6 first as the authority score for node N6 is greater than the authority score for node N7.

Still now alternatively consider the scenario where the node monitoring device 240 determines that node N7 has a hardware failure and node N6 becomes infected by a computer virus causing node N6 to be a DoS threat to other nodes. Unlike the previous examples, in this case it may be appropriate to use the hub score for node N7 and the authority score for node N6, or given the dissimilar nature of the network abnormalities it may be useful to weight the respective hub and authority scores based on the form of abnormality affecting the nodes.

Regardless of whether the ranking device 260 provides raw ranking information to human operators or to some form of automated equipment, it should be apparent to those skilled in the art that the hub and authority scores produced by the ranking device 260 may be useful for network restoration when two or more abnormalities affect the network.

Where the HITS algorithm can be an effective approach to developing ranking information, it should be appreciated that other algorithms, such as the PageRank algorithm used in search engine design, may be alternatively used noting that performance and benefits may differ. For example, unlike the HITS algorithm, the PageRank algorithm is limited to producing authority scores, and so the benefits attributable to hub scores may not be directly available for the disclosed methods and systems. Further details of the PageRank algorithm may be found in U.S. Pat. No. 6,285,999 to Lawrence Page, the content of which is incorporated by reference in its entirety.

Figure 3:
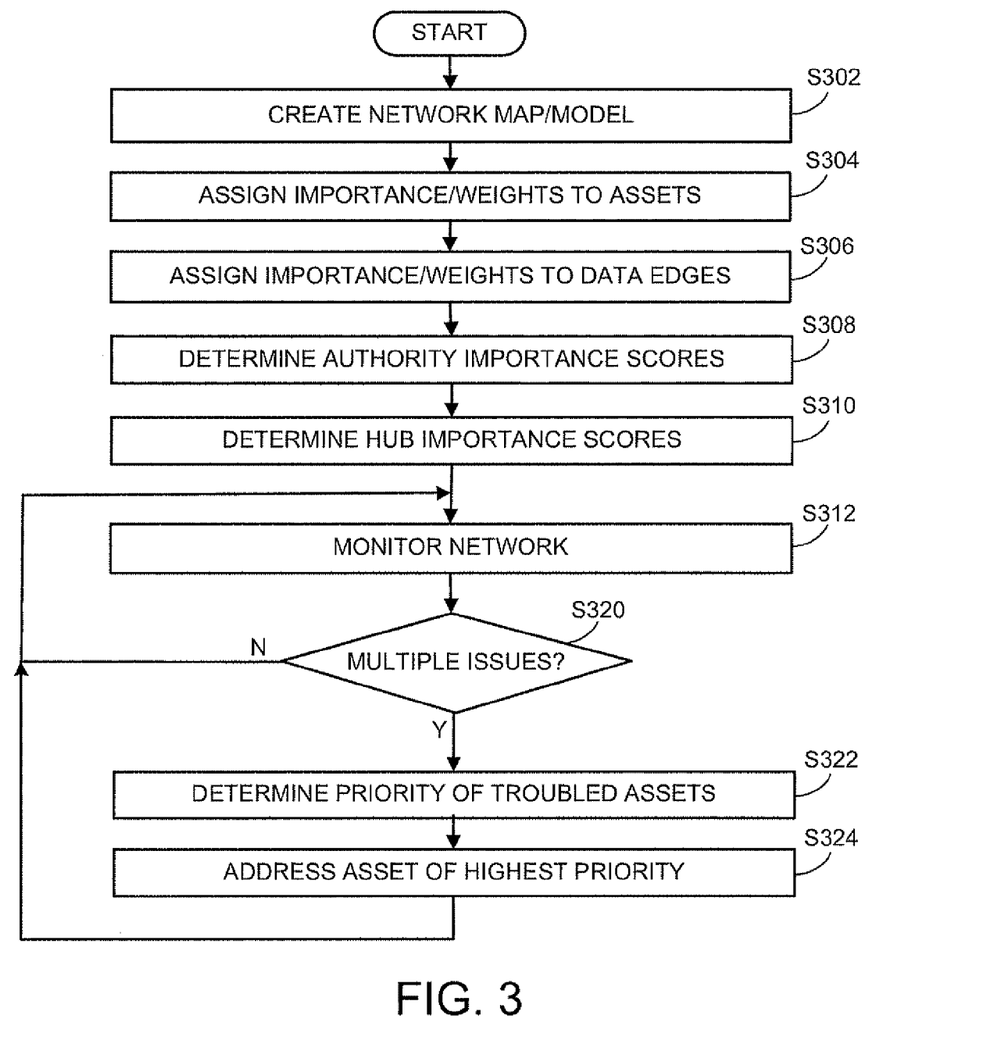
FIG. 3 is a flowchart outlining an exemplary operation of the disclosed methods and systems for prioritizing network abnormalities.

FIG. 3 is a flowchart outlining an exemplary operation of the disclosed methods and systems for prioritizing network abnormalities. While the below-described steps are described as occurring in a particular sequence for convenience, it is to be appreciated by those skilled in the art that the order of various steps may be changed from embodiment to embodiment. It is further to be appreciated that various steps may occur simultaneously or be made to occur in an overlapping fashion.

The process starts in step S302 where a network map, e.g., an adjacency matrix A may be created for a network. Next, in step S304, the importance/weights of network assets, e.g., servers and firewalls, may be determined using the objective and subjective criteria discussed above. Then, in step S306, the importance/weights of communication edges may be similarly determined using the objective and subjective criteria discussed above. Control continues to step S308.

In step S308, a set/vector of authority scores may be determined using the adjacency matrix, node weights and edge weights developed in steps S302-S306. Next, in step S310, a set/vector of hub scores may be determined using the previously determined authority scores developed in steps S308. As discussed above, the hub scores and authority scores may be determined using the weighted HITS algorithm discussed above and embodied in part by equations (1) and (2). However, it should be appreciated that variants of the particular equations disclosed above may be substituted or modified to reasonable degrees as is known to those skilled in the art without departing from the spirit and scope of the present disclosure, and that the PageRank algorithm (or a derivative or variant) may be used to produce hub scores. Control continues to step S312.

In step S312, the network at issue may be monitored for abnormalities. Next, in step S320, a determination may be made based on the monitoring step of S312 as to whether multiple abnormalities have occurred in the network, i.e., whether multiple devices in the network have been compromised in some fashion by hardware failures, software failures, external attacks, and so on. If multiple abnormalities have occurred, control continues to step S322; otherwise, control jumps back to step S312 noting that single abnormalities may be addressed without the benefit of the presently disclosed methods and systems.

In step S322, the priority of which compromised asset may be addressed first may be determined based upon the hub and/or authority scores as well as on the type of abnormality. Next, in step S324, the asset of highest priority may be addressed based upon the determination of step S322. Control then jumps back to step S312 where steps S312-S324 may be repeated as may be necessary or otherwise desirable.

While the above-disclosed methods and systems have been described in conjunction with the specific exemplary embodiments thereof, it is evident that many alternatives, modifications, and variations will be apparent to those skilled in the art. Accordingly, exemplary embodiments of the above-disclosed methods and systems as set forth herein are intended to be illustrative, not limiting. There are changes that may be made without departing from the spirit and scope of the above-disclosed methods and systems.

What is claimed is:

1. An apparatus for addressing device abnormalities in a network, comprising:
monitoring circuitry configured to monitor device abnormalities in the network; and
ranking circuitry that receives information from the monitoring circuitry and, upon receiving information from the monitoring circuitry that multiple devices in the network are compromised, provides ranking information as to which of the multiple compromised devices in the network is to be attended to first,
the ranking circuitry uses at least a matrix representation of the network, the matrix representation including a plurality of entries, each entry representing presence or absence of link between at least two of the multiple devices, and at least two weighting vectors to calculate a rank of a device in the network as $$A(N_j) = \sum_{N_i \in I_j} \frac{A(N_i)}{|I_i|} \times W_{node(i)} \times W_{edge(ij)}$$

wherein $N_j$ and $N_i$ represent devices in the network, $A(N_j)$ and $A(N_i)$ represent ranks for devices $N_j$ and $N_i$ respectively, $I_i$ represents a set of inlinks for device $N_j$, $|I_i|$ represents size of set $I_i$, $W_{node(i)}$ represents a weighting vector for device $N_i$, and $W_{edge(ij)}$ represents a weighting vector for a connectivity between devices $N_j$ and $N_i$, then the ranking circuitry calculates a hub-ranking for each device in the network as $$H(N_j) = \sum_{N_i \in O_j} \frac{A(N_i)}{|I_i|}$$

wherein $H(N_j)$ represents the hub-ranking for device $N_j$, $O_i$ represents a set of inlinks for device $N_j$.

2. The apparatus of claim 1, wherein the ranking circuitry uses the at least two weighting vectors to modify Hyperlink Induced Topic Search (HITS) algorithm to produce a hub-ranking set containing hub scores representing relative values of connections between devices in the network.

3. The apparatus of claim 2, wherein the ranking circuitry provides ranking information also based upon a type of failure of at least one compromised device in the network.

4. The apparatus of claim 3, wherein the ranking circuitry uses the modified HITS algorithm to also produce an authority-ranking set containing authority scores representing relative values of individual devices in the network.

5. The apparatus of claim 4, wherein the ranking circuitry provides ranking information also based upon a type of attack upon at least one compromised device in the network.

6. The apparatus of claim 1, wherein the ranking circuitry uses the at least two weighting vectors to modify Hyperlink Induced Topic Search (HITS) algorithm to produce an authority-ranking set containing authority scores representing relative values of individual devices in the network.

7. The apparatus of claim 6, wherein the ranking circuitry provides ranking information also based upon a type of attack upon at least one compromised device in the network.

8. The apparatus of claim 1, wherein the ranking circuitry uses the at least two weighting vectors to modify Hyperlink Induced Topic Search (HITS) algorithm to produce a hub-ranking set containing hub scores representing relative values of connections between devices in the network and an authority-ranking set containing authority scores representing relative values of individual devices in the network; and
wherein the modified HITS algorithm uses human-subjective values on the importance of at least one of a mission of each device used in the network and a mission of each data type used in the network.

9. The apparatus of claim 8, wherein the modified HITS algorithm uses human-subjective values on a mission of each device used in the network and a mission of each data type used in the network.

10. The apparatus of claim 8, wherein the modified HITS algorithm uses objective criteria including at least an amount of data transferred between at least two devices in the network.

11. A method for addressing device abnormalities in a network, comprising:
monitoring device abnormalities in the network to produce monitoring information;
when the monitoring information indicates that that multiple devices in the network are compromised, providing ranking information as to which of the multiple compromised devices in the network is to be attended to first, wherein
the ranking information is provided using at least a matrix representation of the network, the matrix representation includes a plurality of entries, each entry representing presence or absence of link between at least two of the multiple devices and at least two weighting vectors;
calculating a rank of a device in the network as $$A(N_j) = \sum_{N_i \in I_j} \frac{A(N_i)}{|I_i|} \times W_{node(i)} \times W_{edge(ij)}$$

wherein $N_j$ and $N_i$ represent devices in the network, $A(N_j)$ and $A(N_i)$ represent ranks for devices $N_j$ and $N_i$ respectively, $I_i$ represents a set of inlinks for device $N_j$, $|I_i|$ represents size of set $I_i$, $W_{node(j)}$ represents a weighting vector for device $N_i$, and $W_{edge(ij)}$ represents a weighting vector for a connectivity between devices $N_j$ and $N_i$; and
calculating a hub-ranking for each device in the network as $$H(N_j) = \sum_{N_i \in O_j} \frac{A(N_i)}{|I_i|}$$

wherein $H(N_j)$ the hub-ranking for device $N_j$, $O_i$ represents a set of inlinks for device $N_i$.

12. The method of claim 11, wherein the ranking information is provided using the at least two weighting vectors to modify Hyperlink Induced Topic Search (HITS) algorithm to produce a hub-ranking set containing hub scores representing relative values of connections between devices in the network.

13. The method of claim 12, wherein the ranking information is produced based upon a type of failure of at least one compromised device in the network.

14. The method of claim 11, wherein the ranking information is provided using the at least two weighting vectors to modify Hyperlink Induced Topic Search (HITS) algorithm to produce an authority-ranking set containing authority scores representing relative values of individual devices in the network.

15. The method of claim 14, wherein the ranking information is produced based upon a type of attack upon at least one compromised device in the network.

16. The method of claim 11, wherein the ranking information is provided using the at least two weighting vectors to modify Hyperlink Induced Topic Search (HITS) algorithm to produce a hub-ranking set containing hub scores representing relative values of connections between devices in the network, and an authority-ranking set containing authority scores representing relative values of individual devices in the network.

17. The method of claim 16, wherein the modified HITS algorithm uses human-subjective values on the importance of at least one of a mission of each device used in the network and a mission of each data type used in the network.

18. The method of claim 17, wherein the modified HITS algorithm uses human-subjective values on a mission of each device used in the network and a mission of each data type used in the network.

19. The method of claim 18, wherein the modified HITS algorithm uses objective criteria including at least an amount of data transferred between at least two devices in the network.

20. An apparatus for addressing device abnormalities in a network, comprising:
monitoring means for monitoring device abnormalities in the network; and
ranking means for receiving information from the monitoring means and, upon receiving information from the monitoring means that multiple devices in the network are compromised, providing ranking information as to which of the multiple compromised devices in the network is to be attended to first, wherein:
the ranking means is configured to provide ranking information using a matrix representation of the network, the matrix representation includes a plurality of entries, each entry representing presence or absence of link between at least two of the multiple devices, and a hub-ranking set containing hub scores representing relative values of connections between devices in the network and an authority-ranking set containing authority scores representing relative values of individual devices in the network, wherein both the hub-ranking set and the authority-ranking set are derived using at least two weighting vectors and Hyperlink Induced Topic Search (HITS) algorithm; and
the ranking means is further configured to produce ranking information based upon at least one of information relating to a type of failure of at least one compromised device in the network and a type of attack upon at least one compromised device in the network and to calculate a rank of a device in the network as $$A(N_j) = \sum_{N_i \in I_j} \frac{A(N_i)}{|I_i|} \times W_{node(i)} \times W_{edge(ij)}$$

wherein $N_j$ and $N_i$ represent devices in the network, $A(N_j)$ and $A(N_i)$ represent ranks for devices $N_j$ and $N_i$ respectively, $I_i$ represents a set of inlinks for device $N_j$, $|I_i|$ represents size of set $I_i$, $W_{node(i)}$ represents a weighting vector for device $N_i$, and $W_{edge(ij)}$ represents a weighting vector for a connectivity between devices $N_j$ and $N_i$, the ranking means further configured to calculate a hub-ranking for each device in the network as $$H(N_j) = \sum_{N_i \in O_j} \frac{A(N_i)}{|I_i|}$$

wherein $H(N_j)$ represents the hub-ranking for device $N_j$, $O_i$ represents a set of inlinks for device $N_i$.

* * * * *

UNITED STATES PATENT AND TRADEMARK OFFICE
CERTIFICATE OF CORRECTION

PATENT NO. : 8,533,319 B2  
APPLICATION NO. : 12/792289  
DATED : September 10, 2013  
INVENTOR(S) : Michael Draugelis Page 1 of 1

It is certified that error appears in the above-identified patent and that said Letters Patent is hereby corrected as shown below:

In the Claims

Claim 11, Column 8, Line 43, should read "when the monitoring information indicates that ~~that~~ multiple…"

Claim 11, Column 8, Line 63, should read "represents size of set $I_i$, ~~$W_{node(j)}$~~ $\underline{W_{node(i)}}$ represents…"

Claim 11, Column 9, Line 1, should read "wherein $H(N_j)$ $\underline{represents}$ the hub-ranking for device…"

Claim 20, Column 10, Line 46, should read "wherein ~~$H(N_i)$~~ $\underline{H(N_j)}$ represents the hub-ranking…"

Signed and Sealed this  
Tenth Day of December, 2013

Margaret A. Focarino  
*Commissioner for Patents of the United States Patent and Trademark Office*